(12) United States Patent
Charleux et al.

(10) Patent No.: US 7,635,740 B2
(45) Date of Patent: Dec. 22, 2009

(54) METHOD FOR RADICAL EMULSION POLYMERISATION USING HYDROSOLUBLE ALKOXYAMINES

(75) Inventors: Bernadette Charleux, Vincennes (FR); Olivier Guerret, La Tour de Salvagny (FR); Stéphanie Magnet, Morlanne (FR); Julien Nicolas, La Garenne Colombes (FR)

(73) Assignee: Arkema France, Colombes (FR)

( * ) Notice: Subject to any disclaimer, the term of this patent is extended or adjusted under 35 U.S.C. 154(b) by 386 days.

(21) Appl. No.: 10/588,118

(22) PCT Filed: Feb. 3, 2005

(86) PCT No.: PCT/FR2005/000234

§ 371 (c)(1),
(2), (4) Date: Aug. 1, 2006

(87) PCT Pub. No.: WO2005/082945

PCT Pub. Date: Sep. 9, 2005

(65) Prior Publication Data

US 2007/0123669 A1 May 31, 2007

(30) Foreign Application Priority Data

Feb. 6, 2004 (FR) .................... 04 01150

(51) Int. Cl.
*C08F 4/00* (2006.01)
*C07C 217/02* (2006.01)

(52) U.S. Cl. .............. 526/220; 526/193; 526/217; 526/317.1; 526/319; 526/346; 525/255; 525/259; 525/299; 524/707

(58) Field of Classification Search ............. 526/271
See application file for complete search history.

(56) References Cited

U.S. PATENT DOCUMENTS

| 3,546,154 | A * | 12/1970 | Hwa et al. ............ 524/745 |
| 6,353,065 | B1 * | 3/2002 | Charleux et al. ........ 526/220 |
| 6,657,043 | B1 * | 12/2003 | Guerret et al. ........ 528/422 |
| 2003/0149205 | A1 * | 8/2003 | Callais et al. ......... 526/220 |

OTHER PUBLICATIONS

Charleux et al. Nitroxide-Mediated Controlled Free-Radical Emulsion Polymerization of Styrene and n-Butyl Acrylate with a Water-Soluble Alkoxyamine as Initiator. Published Nov. 17, 2004. Angewandte Chemie International Edition. vol. 43, Iss. 45. pp. 6186-6189.*
Details of the above article. Scheme 1.*

* cited by examiner

*Primary Examiner*—Randy Gulakowski
*Assistant Examiner*—Brieann R Fink
(74) *Attorney, Agent, or Firm*—Steven D. Boyd (57) ABSTRACT

The present invention relates to a process for radical emulsion, miniemulsion or microemulsion polymerization employing at least one water-soluble alkoxyamine.

This process makes it possible to prepare multiblock (co)polymers, in particular diblock and triblock (co)polymers.

16 Claims, 2 Drawing Sheets

Figure 1

Number distribution of the diameter of the particles (Dp)

Figure 2

Number distribution of the diameter of the particles (Dp)

Figure 3

Number distribution of the diameter of the particles (Dp)

Figure 4

Number distribution of the diameter of the particles (Dp)

Figure 5

METHOD FOR RADICAL EMULSION POLYMERISATION USING HYDROSOLUBLE ALKOXYAMINES

FIELD OF THE INVENTION

The invention relates to a process for the emulsion, microemulsion or miniemulsion polymerization of at least one monomer which can be polymerized by the radical route employing a water-soluble alkoxyamine.

PRIOR ART

EP 970 973 discloses a process for the emulsion polymerization of at least one monomer which can be polymerized by the radical route in the presence of a stable free radical, such as 2,2,6,6-tetramethyl-1-piperidinyloxy, sold generally under the name TEMPO, or one of its derivatives, and of an emulsifying agent, the polymerization being initiated by a polymerization initiating agent, preferably a water-soluble one, chosen from organic peroxides and hydroperoxides, azo derivatives, metal and ammoniacal salts of persulfate, or redox pairs.

Marestin C., Noël C., Guyot A. and Claverie J., Macromolecules, 1998, 31(12), 4041-4044, describe a process for the controlled radical emulsion polymerization of styrene in the presence of an amino-TEMPO derivative represented by the formula (A) below, (A)

of a water-soluble initiator of persulfate type and of surfactants of SDS or SDBS type. This process results in stable latexes being obtained which exhibit levels of solids of the order of 10% and which exhibit a bimodal distribution in the particle size However, even at 130° C., it is found that the polymerization kinetics are very slow and the conversion of the styrene only just reaches 70% after polymerizing for 55 hours!

Cao J., He J., Li C. and Yang Y., Polym. J, 2001, 33, 75, describe another example of controlled radical emulsion polymerization of styrene with several TEMPO derivatives which makes it possible to obtain stable latexes at 120° C., the distribution in the particle sizes of which is monomodal.

Nevertheless, it is found that the use of TEMPO derivatives is limited to the control of styrene monomers.

The literature, in addition to controlled radical polymerization processes, the initiation of which, carried out in the aqueous phase, involves two-component initiating systems, the control agent of which is TEMPO or one of its derivatives, also describes controlled radical polymerization processes, the initiation of which involves an N-(tert-butyl)-1-diethylphosphono-2,2-dimethylpropyl nitroxide (SG1) derivative, the polymerization initiator being a water-soluble initiator of persulfate, diazo or peroxide type:

N-(tert-butyl)-1-diethylphosphono-2,2-dimethylpropyl nitroxide (SG1)

WO 00/49027 discloses a process for the solvent medium, bulk or miniemulsion radical polymerization of styrene and acrylate monomers in the presence of organosoluble alkoxyamines derived from SG1 corresponding to the formula (B) below.

Alkoxyamines (B)

DESCRIPTION OF THE INVENTION

The process for the miniemulsion, microemulsion or emulsion polymerization of at least one monomer which can be polymerized by the radical route according to the invention is carried out in the presence of at least one water-soluble alkoxyamine, preferably:

a monoalkoxyamine of formula (I)

in which $R_1$ and $R_3$, which are identical or different, represent a linear or branched alkyl radical having a number of carbon atoms ranging from 1 to 3, $R_2$ represents an alkali metal, such as Li, Na or K, or an ammonium ion, such as $NH_4^+$, $NBu_4^+$ or $NHBu_3^+$ (Bu being the abbreviation for butyl), or a mono- or a polyalkoxyamine of formula (II)

where m is an integer of greater than or equal to 1, preferably of greater than or equal to 2, and $R_1$, $R_2$ and $R_3$ have the same meaning as in the formula (I).

The polymerization medium comprises a liquid organic phase and a liquid aqueous phase, said liquid organic phase preferably comprising more than 50% by weight of monomer(s) to be polymerized and said aqueous phase preferably comprising at least 50% by weight of water.

The process of the present invention makes possible access to latexes formed of (co)polymers possessing controlled macromolecular architectures.

Without the Applicant Company being committed to any one explanation, it believes that the water-soluble alkoxyamines of formula (I) and/or (II) act both as initiating agent and as emulsifying agent in the process according to the invention; thus, the surfactant properties of the water-soluble alkoxyamines of formula (I) and/or (II) make it possible to reduce, indeed even avoid, the use of other surfactants in said emulsion, miniemulsion or microemulsion process.

The term "water-soluble alkoxyamine", within the meaning of the present invention, is understood as indicating any alkoxyamine of formula (I) or (II) having a solubility in the aqueous phase of at least 1 g/l at 25° C.

The alkoxyamine can be introduced into the polymerization medium in a proportion of 0.01% to 10%, preferably 0.1 to 5%, by weight, with respect to the weight of monomer(s).

The term "monomer" is understood to mean any monomer which can be polymerized or copolymerized by the radical route. The term "monomer" covers, of course, mixtures of several monomers.

The monomer can be chosen from monomers exhibiting a carbon-carbon double bond capable of polymerizing by the radical route, such as vinyl, vinylidene, diene and olefinic, allyl, acrylic or methacrylic monomers, and the like.

The monomers under consideration can in particular be chosen from vinylaromatic monomers, such as styrene or substituted styrenes, in particular α-methylstyrene and sodium styrenesulfonate, dienes, such as butadiene or isoprene, acrylic monomers, such as acrylic acid or its salts, alkyl, cycloalkyl or aryl acrylates, such as methyl, ethyl, butyl, ethylhexyl or phenyl acrylate, hydroxyalkyl acrylates, such as 2-hydroxyethyl acrylate, ether alkyl acrylates, such as 2-methoxyethyl acrylate, alkoxy- or aryloxypolyalkylene glycol acrylates, such as methoxypolyethylene glycol acrylates, ethoxypolyethylene glycol acrylates, methoxypolypropylene glycol acrylates, methoxypolyethylene glycol-polypropylene glycol acrylates or their mixtures, aminoalkyl acrylates, such as 2-(dimethylamino)ethyl acrylate (ADAME), acrylates of amine salts, such as [2-(acryloyloxy)ethyl]trimethylammonium chloride or sulfate or [2-(acryloyloxy)ethyl]dimethylbenzylammonium chloride or sulfate, fluoroacrylates, silylated acrylates or phosphorus-comprising acrylates, such as alkylene glycol acrylate phosphates, methacrylic monomers, such as methacrylic acid or its salts, alkyl, cycloalkyl, alkenyl or aryl methacrylates, such as methyl, lauryl, cyclohexyl, allyl or phenyl methacrylate, hydroxyalkyl methacrylates, such as 2-hydroxyethyl methacrylate or 2-hydroxypropyl methacrylate, ether alkyl methacrylates, such as 2-ethoxyethyl methacrylate, alkoxy- or aryloxypolyalkylene glycol methacrylates, such as methoxypolyethylene glycol methacrylates, ethoxypolyethylene glycol methacrylates, methoxypolypropylene glycol methacrylates, methoxypolyethylene glycol-polypropylene glycol methacrylates or their mixtures, aminoalkyl methacrylates, such as 2-(dimethylamino)ethyl methacrylate (MADAME), methacrylates of amine salts, such as [2-(methacryloyloxy)ethyl]trimethylammonium chloride or sulfate or [2-(methacryloyloxy)ethyl]dimethylbenzylammonium chloride or sulfate, fluoromethacrylates, such as 2,2,2-trifluoroethyl methacrylate, silylated methacrylates, such as 3-methacryloyloxypropyltrimethylsilane, phosphorus-comprising methacrylates, such as alkylene glycol methacrylate phosphates, hydroxyethylimidazolidone methacrylate, hydroxyethylimidazolidinone methacrylate or 2-(2-oxo-1-imidazolidinyl) ethyl methacrylate, acrylonitrile, acrylamide or substituted acrylamides, 4-acryloylmorpholine, N-methylolacrylamide, acrylamidopropyltrimethylammonium chloride (APTAC), acrylamidomethylpropanesulfonic acid (AMPS) or its salts, methacrylamide or substituted methacrylamides, N-methylolmethacrylamide, methacrylamidopropyltrimethylammonium chloride (MAPTAC), itaconic acid, maleic acid or its salts, maleic anhydride, alkyl or alkoxy- or aryloxypolyalkylene glycol maleates or hemimaleates, vinylpyridine, vinylpyrrolidinone, (alkoxy)poly(alkylene glycol) vinyl ethers or divinyl ethers, such as methoxypoly(ethylene glycol) vinyl ether or poly(ethylene glycol) divinyl ether, olefinic monomers, among which may be mentioned ethylene, butene, hexene and 1-octene, as well as fluoroolefinic monomers and vinylidene monomers, among which may be mentioned vinylidene fluoride, alone or as a mixture of at least two abovementioned monomers.

It is possible to add, to the polymerization medium, at least one emulsifying agent, that is to say a surfactant which makes it possible to stabilize the emulsion, it being understood that said emulsifying agent is not an alkoxyamine within the meaning of the present invention. Any emulsifying agent standard for this type of emulsion can be used.

The emulsifying agent can be anionic, cationic or nonionic. The emulsifying agent can be an amphoteric or quaternary or fluorinated surfactant. It can be chosen from alkyl or aryl sulfates, alkyl- or arylsulfonates, fatty acid salts, poly(vinyl alcohol)s or polyethoxylated fatty alcohols. By way of example, the emulsifying agent can be chosen from the following list:

sodium lauryl sulfate,
sodium dodecylbenzenesulfonate,
sodium stearate,
polyethoxylated nonylphenol,
dihexyl sodium sulfosuccinate,
dioctyl sodium sulfosuccinate,
lauryidimethylammonium bromide,
lauryl amido betaine,
potassium perfluorooctylacetate.

The emulsifying agent can also be a block or random or grafted amphilphilic copolymer, such as sodium styrenesulfonate copolymers and in particular polystyrene-b-poly (sodium styrenesulfonate), or any amphiphilic copolymer prepared by any other polymerization technique.

The emulsifying agent can be introduced into the polymerization medium in a proportion of 0.1% to 10% by weight, with respect to the weight of monomer(s).

The term "miniemulsion" is understood to mean an emulsion in which the organic phase forms droplets with a diameter of less than 2 µm, generally ranging from 100 to 1000 nm.

The miniemulsion state is generally obtained by virtue of sufficient shearing of the medium and by virtue of the presence, in the miniemulsion, of a hydrophobic polymer and of a cosolvent.

The hydrophobic polymer has to be soluble in the organic phase, preferably exhibits a solubility in water at 25° C. of less than $1 \times 10^{-6}$ g/liter and exhibits a weight-average molecular weight at least equal to 100 000, for example ranging from 100 000 to 400 000. By way of examples, the hydrophobic polymer can be polystyrene, poly(methyl methacrylate) or poly(butyl acrylate).

The hydrophobic polymer can be introduced into the emulsion in a proportion of 0.5 to 2% by weight, with respect to the monomer to be polymerized.

The cosolvent exhibits a solubility in water at 25° C. of less than $1 \times 10^{-6}$ g/liter and is liquid at the polymerization temperature and, for example, exhibits a hydrocarbon sequence of at least six carbon atoms.

If the cosolvent does not comprise fluorine atoms, the hydrocarbon sequence preferably comprises at least 12 carbon atoms.

By way of examples, the cosolvent can be:
hexadecane,
stearyl methacrylate,
dodecyl methacrylate,
perfluorooctyl methacrylate.

The shearing sufficient to produce the miniemulsion state can be produced by vigorous stirring, for example obtained with ultrasound. Once the miniemulsion state has been obtained, it is generally possible to reduce the shearing by bringing it back to that standard for emulsions in general while retaining the miniemulsion state.

The term "microemulsion" is understood to mean an emulsion as defined, for example, in the publications by Candau, F., Microemulsion Polymerization. NATO ASI Series, Series E: Applied Sciences (1997), 335 (Polymeric Dispersions: Principles and Applications), 127-140; by Morgan, John D., Microemulsion Polymerization. Recent Research Developments in Macromolecules Research (1998), 3 (Pt. 2), 551-592; by Capek, Advances in Colloid and Interface Science, 82 (1999) 253-273 and 92 (2001) 195-233.

The emulsion, the miniemulsion or the microemulsion can be produced by mixing with stirring, with more or less high shearing, an aqueous phase comprising:
water,
at least one water-soluble alkoxyamine of type (I) and/or (II) as defined above,
optionally an emulsifying agent,
and an organic phase comprising:
the monomer(s),
an optional organic solvent,
an optional cosolvent, in particular in the case of a miniemulsion.

The polymerization temperatures depend on the monomers present in the medium. Thus, in order to initiate the polymerization of methacrylate starting from the alkoxyamines (I) and/or (II), a polymerization temperature of between 10 and 80° C. is preferred; for the other monomers, a temperature generally of between 50° C. and 130° C. is chosen. The process according to the invention is carried out at a pressure sufficient to prevent the phases of the emulsion from boiling and sufficient for its various constituents to remain essentially in the emulsion (minimization of the passage into the vapor phase of the various constituents).

The polymerization process according to the invention leads to a polymer latex. Within this latex, the combination of the polymer particles exhibits a mean diameter of less than 2 µm, generally of between 0.01 µm and 1 µm.

The polymers obtained are living polymers carrying alkoxyamine functional groups. They can be themselves reengaged one or more times in a radical polymerization process with the abovementioned monomers to result in block copolymers.

The process according to the invention thus makes possible the preparation of block polymers. This is because the polymerization of a first monomer by the process according to the invention results in a living polymer block. It is then possible to connect, to this first block, a block of another polymer by placing the first living polymer block in a medium for the polymerization of a second monomer. It is thus possible to produce block copolymers, for example copolymers comprising one or more polystyrene blocks and one or more polybutadiene blocks, or copolymers comprising one or more polystyrene blocks and one or more blocks of the methacrylate type and one or more blocks of the acrylate type.

In practice, the blocks can be prepared one after the other in the same equipment. When the first monomer is consumed so as to produce the first block, it is sufficient to introduce the second monomer intended for the preparation of the second block, without halting the stirring and without cooling or other interruption. Of course, depending on the nature of the monomers, the conditions for forming each of the blocks, such as the temperature of the emulsion, can be adjusted.

Of course, it is possible to attach as many blocks as desired to the living polymer by placing the latter in a medium for the polymerization of a monomer from which it is desired to form a block.

Thus, the invention also relates to a process for the preparation of a block polymer comprising at least one stage according to the invention resulting in a first living block, said living block subsequently being placed in the presence of at least one other monomer from which it is desired to form a block attached to the first block, so as to form a living diblock, and so on, depending on the number of blocks which it is desired to produce.

Thus, the present application also relates to a process for the preparation of a diblock polymer comprising a stage of polymerization of a first monomer in accordance with the invention, so as to obtain a first living block, followed by a stage during which the first living block is placed in the presence of a second monomer which is polymerized, so as to form a second block attached to the first block.

The present application thus also relates to a process for the preparation of a multiblock polymer comprising one or more stages of polymerization of other monomers in the presence of the diblock polymers prepared in accordance with what has just been stated, so as to form a third block attached to the diblock polymer. This process of block reuse can be repeated the number of times necessary to achieve the desired number of blocks.

By way of examples, the following block polymers can be produced:
polystyrene-b-poly(methyl methacrylate),
polystyrene-b-polystyrenesulfonate,
polystyrene-b-polyacrylamide,
polystyrene-b-polymethacrylamide,
poly(methyl methacrylate)-b-poly(ethyl acrylate),
polystyrene-b-poly(butyl acrylate), polybutadiene-b-poly(methyl methacrylate),
polyisoprene-b-poly(styrene-co-acrylonitrile),
polybutadiene-b-poly(styrene-co-acrylonitrile),
poly(styrene-co-butyl acrylate)-b-poly(methyl methacrylate),
polystyrene-b-poly(vinyl acetate),
polystyrene-b-poly(2-ethylhexyl acrylate),
polystyrene-b-poly(methyl methacrylate-co-hydroxyethyl acrylate),
polystyrene-b-polybutadiene-b-poly(methyl methacrylate),
polybutadiene-b-polystyrene-b-poly(methyl methacrylate),
polystyrene-b-poly(butyl acrylate)-b-polystyrene,
polystyrene-b-polybutadiene-b-polystyrene,
polystyrene-b-polyisoprene-b-polystyrene,
poly(perfluorooctyl acrylate)-b-poly(methyl methacrylate),
poly(perfluorooctyl acrylate)-b-polystyrene,
poly(perfluorooctyl acrylate)-b-poly(behenyl acrylate),
poly(perfluorooctyl acrylate)-b-poly(stearyl methacrylate),
poly(n-octyl acrylate)-b-poly(ethyl methacrylate),
poly(methyl methacrylate)-b-poly(butyl acrylate)-b-poly(methyl methacrylate),
poly(methyl methacrylate)-b-poly(methoxyethyl acrylate)-b-poly(methyl acrylate),
poly((meth)acrylic acid)-b-poly(butyl acrylate)-b-poly((meth)acrylic acid).

In the context of the present invention, the term "polymer" or "polymer block" is to be taken in its general sense, so that it covers homopolymers, copolymers, terpolymers and polymer blends. The term "polymerization" is to be taken in a sense which is also general.

The pH of the aqueous phase may be fixed, depending on the type of monomer(s) (co)polymerized. In the case of polymerization conditions with a pH>8, it is preferable to use the alkoxyamines (I) and/or (II) for which $R_2$ is an alkali metal atom. The alkoxyamine is then introduced into the reaction medium via an aqueous solution with a concentration of $10^{-1}$ mol·l$^{-1}$ of pH=9. In the case of polymerization conditions with a pH<6, an alkoxyamine (I) and/or (II) for which $R_2$ is an ammonium ion may be preferred. In the case where it is desired to maintain a pH of between 6 and 7, any alkoxyamine (I) and/or (II) will be used, an amount of buffer, for example, of calcium hydrogencarbonate, being added to the aqueous phase. Interestingly, the polymerizations which take place at low pH (<5) are generally faster but less well controlled than those which take place at pH>5.

The present invention also claims the possibility of converting the residual monomers from one of the stages described above using an additional supply of free radical initiator(s) of organic and/or inorganic peroxide type and/or of azo type. The essential difference from the polymerization process described above is that, instead of carrying out all the conversion (polymerization) of the monomers by controlled radical polymerization, the polymerization is begun under controlled radical polymerization conditions and is completed under conventional radical polymerization conditions (i.e., with peroxides, persulfates, azo compounds and/or their equivalents). The monomers which are polymerized under conventional radical polymerization conditions may be already present during the controlled radical polymerization and may not have been converted or else they are added to the aqueous solution comprising the portion of the dispersant already prepared by controlled radical polymerization or else again according to a combination of these alternatives. In order to carry out this conventional radical polymerization, conventional radical generators well known to a person skilled in the art and frequently used during conventional radical polymerization reactions in aqueous medium are added to the aqueous solution comprising the portion of the dispersant already prepared by controlled radical polymerization. Mention may nonexclusively be made, among these radical generators, of metal and ammoniacal salts of persulfate, such as sodium persulfate, potassium persulfate and ammonium persulfate, water-soluble azo initiators, such as 2,2'-azobis(2-amidinopropane) dihydrochloride and metal and ammoniacal salts of 4,4'-azobis(4-cyanopentanoic acid), redox pairs, such as the (sodium, potassium or ammonium) persulfate/vitamin C pair or the sodium or potassium metabisulfite/persulfate pair or the aqueous hydrogen peroxide solution/ferrous ion salts pair or the tert-butyl hydroperoxide/sodium sulfoxylate pair, and any other possible oxidizing agent(s)/reducing agent(s) combination. When the amount of residual monomers to be converted after the controlled radical polymerization reaction is considerable, the use of conventional radical polymerization initiators will result in aqueous solutions or dispersions of a blend of copolymers of different origins, those obtained by conventional radical polymerization and those obtained by controlled radical polymerization. For this conventional radical polymerization stage, the use is not ruled out of chain-transfer agents, such as those used conventionally in conventional radical polymerization in an aqueous medium, even if, advantageously, they are not used. Mention may nonexclusively be made, among transfer agents used in conventional radical polymerizations, of isopropanol, water-soluble mercaptans, such as thioglycolic acid or mercaptopropionic acid or mercaptoethanol.

In the examples which follow, the following characterization techniques were used:
conversion of monomer to polymer: by measuring the solids content, with respect to the weight of monomer charged,
mean diameter of the particles: by light scattering (Malvern Zeta Sizer 4 device),
molecular weights and polydispersity of the polymers: by steric exclusion chromatography after washing the polymer with water to free it from water-soluble entities. Use was made of a "Waters" chromatograph, tetrahydrofuran (THF) acting as eluent. The chromatograph was equipped with four PL Gel® 10 μm columns (poly(styrene)divinylbenzene) of 100, 500, 1000 and 10 000 Å and with double detection (refractometer and UV at 254 nm). Calibration was carried out with standard polystyrene samples. The polymers were injected at 10 mg/ml for a flow rate of 1 ml/min.

WAYS OF IMPLEMENTING THE INVENTION

EXAMPLE 1 A

Preparation of 2-methyl-2-[N-(tert-butyl)-N-(diethoxyphosphoryl-2,2-dimethylpropyl)aminoxy] propionic acid

Procedure:

500 ml of degassed toluene, 35.9 g of CuBr (250 mmol), 15.9 g of copper powder (250 mmol) and 86.7 g of N,N,N',N',N"-pentamethyldiethylenetriamine (PMDETA) (500 mmol) are introduced into a 2 l glass reactor purged with nitrogen and then, with stirring at ambient temperature (20° C.), a mixture comprising 500 ml of degassed toluene, 42.1 g of 2-bromo-2-methylpropionic acid (250 mmol) and 78.9 g of 84% SG1, i.e. 225 mmol, is introduced.

Reaction is allowed to take place at ambient temperature and with stirring for 90 min and then the reaction medium is filtered. The toluene filtrate is washed twice with 1.5 l of a saturated aqueous NH$_4$Cl solution.

A yellowish solid is obtained which is washed with pentane to give 51 g of 2-methyl-2-[N-(tert-butyl)-N-(diethoxyphosphoryl-2,2-dimethylpropyl)aminoxy]propionic acid (yield 60%).

The analytical results are given below:
molar mass determined by mass spectrometry: 381.44 g·mol$^{-1}$ (for C$_{17}$H$_{36}$NO$_6$P)
elemental analysis (empirical formula: C$_{17}$H$_{36}$NO$_6$P):
  % calculated: C=53.53; H=9.51; N=3.67
  % found: C=53.57; H=9.28; N=3.77
melting point determined on a Büchi B-540 device: 124° C./125° C.

$^{31}$P NMR (CDCl$_3$): δ 27.7
$^1$H NMR (CDCl$_3$):
  δ 1.15 (singlet, 9H on carbons 15, 21 and 22),
  δ 1.24 (singlet, 9H on carbons 17, 23 and 24),
  δ 1.33-1.36 (multiplet, 6H on carbons 4 and 7),
  δ 1.61 (multiplet, 3H on carbon 18),
  δ 1.78 (multiplet, 3H on carbon 13),
  δ 3.41 (doublet, 1H on carbon 9),
  δ 3.98-4.98 (multiplet, 4H on carbons 3 and 6)
  δ 11.8 (singlet —OH).
$^{13}$C NMR (CDCl$_3$):

| Carbon atom No. | δ |
| --- | --- |
| 3 and 6 | 60.28-63.32 |
| 9 | 69.86 |
| 12 | 63 |
| 13 | 28.51 |
| 14 | 36.04 |
| 15, 21 and 22 | 29.75 |
| 16 | 63.31 |
| 17, 23 and 24 | 28.74 |
| 18 | 24.08 |
| 19 | 176.70 | kd (120° C.) = 0.2 s$^{-1}$.

1.7 equivalents of a sodium hydroxide solution are slowly added, at ambient temperature and with magnetic stirring, to an aqueous suspension of this alkoxyamine. Stirring is maintained at ambient temperature for 30 min and the alkoxyamine (I) where R$_2$=Na is used as is in the following examples.

Elemental analysis (empirical formula C$_{17}$H$_{35}$NO$_6$PNa)
Percentage calculated: C=50.61; H=8.74; N=3.47.
Percentage found: C=49.29; H=8.97; N=3.01.
kd (120° C.)=0.2 s$^{-1}$ $^{31}$P NMR (C$_6$D$_6$): δ 8.05
$^1$H NMR (C$_6$D$_6$):
  δ 1.24-1.48 (unresolved peak, 24H on carbons 4, 7, 15, 17, 21 and 24),
  δ 1.91 (singlet, 3H on carbon 18),
  δ 2.07 (singlet, 3H on carbon 13),
  δ 3.43 (doublet, 1H on carbon 9),
  δ 4.15-4.6 (unresolved peak, 4H on carbons 3 and 6)
$^{13}$C NMR (C$_6$D$_6$):

| Carbon atom No. | δ |
| --- | --- |
| 3, 6 | 61.33-61.42 |
| 4, 7 | 16.55-16.70 |
| 9 | 71.08 |
| 12 | 86.36 |
| 13/18 | 24-29.10 |
| 14 | 36.24 |
| 15, 21 and 22 | 30.23 |
| 16 | 62.42 |
| 17, 28 and 24 | 29.27 |
| 19 | 180.74 |

EXAMPLE 1 B

Preparation of a Dialkoxyamine from the Monoalkoxyamine Obtained in 1 A

The following are introduced into a 100 ml round-bottomed flask purged with nitrogen:
  2 g of alkoxyamine prepared under 1 A (2 equivalents)
  0.52 g of 1,4-butanediol diacrylate with a purity of >98% (1 equivalent)
  6.7 ml of ethanol.

The mixture is heated at reflux (temperature 78° C.) for 20 h and then the ethanol is evaporated under vacuum. 2.5 g of a very viscous yellow oil are obtained.

The $^{31}$P NMR analysis shows the complete disappearance of the 2-methyl-2-[N-(tert-butyl)-N-(diethoxyphosphoryl-2,2-dimethylpropyl)aminoxy]propionic acid (27.4 ppm) and the appearance of the dialkoxyamine (multiplet at 24.7-25.1 ppm).

The analysis by mass spectrometry of electrospray type shows the mass 961 (M+).

EXAMPLE 2

Measurement of the Critical Micelle Concentration (CMC) of the Alkoxyamine (I) Prepared in 1 A From the viewpoint of better characterizing the surfactant behavior of the alkoxyamine (I) where $R_2$=Na, the kinetics of lowering the interfacial tension of this alkoxyamine dissolved in water were observed as a function of its concentration. The value of its critical micelle concentration (CMC), of the degree of coverage and of the area per molecule of alkoxyamine adsorbed at the interface were thus evaluated.

The interface against which it was chosen to operate is air. The measurements carried out in air for the alkoxyamine (I) where $R_2$=Na are compared with the values obtained for conventional surfactants of SDS (sodium dodecylbenzenesulfonate) type.

A drop tensiometer sold by ITC Concept was used to measure the interfacial tensions. The principle is as follows. A drop is automatically formed at the end of the needle of a syringe in a vessel filled with another liquid. The drop is illuminated by a uniform light source. The image of the outline of the drop is projected by a telecentric lens onto a CCD camera and then digitized. It is subsequently processed by Windrop 1.1 software in order to determine the interfacial tension, the surface area and the volume of the drop via the Laplace-Young equation. It is thus possible to monitor, as a function of the time, the variations in the interfacial tension $\gamma_{30\,min}$ during, for example, the adsorption of a surfactant at the interface of two liquids (kinetics of lowering the interfacial tension) and thus to determine several of its characteristics, such as the critical micelle concentration (CMC), the degree of coverage (G), the area per molecule of surfactant at the interface (a), and the like.

The results of the measurements against air with
the alkoxyamine (I)
SDS are combined in table 1.

TABLE 1

| Expt. | Interface | CMC (mol · l$^{-1}$) | $\gamma_{30\,min}$ (mN/m) |
|---|---|---|---|
| SDS | air | $6.3 \times 10^{-3}$ | 40.8 |
| Alkoxyamine (I) | air | $6.5 \times 10^{-2}$ | 36.2 |

This measurement clearly demonstrates that the alkoxyamine can participate in the stabilization of the emulsion since it has a pronounced surfactant nature.

EXAMPLE 3

Controlled Radical Polymerization of Butyl Acrylate Under Batch Conditions Initiated by the Water-soluble Alkoxyamine (I) Prepared in 1 A by the Miniemulsion Technique—Conversion of the Residual Monomers by Conventional Radical Polymerization with Ammonium Persulfate On the one hand, an organic solution is prepared by mixing:
85 g (i.e., 0.7 mol) of butyl acrylate,
0.11 g of polystyrene with a weight-average molecular weight (Mw) of 330 000,
0.68 g (i.e., 3.0 mmol) of hexadecane.

On the other hand, an aqueous solution is prepared by mixing:
323 g of water,
1.87 g (i.e., 2.3 mmol) of emulsifying agent Dowfax 8390,
0.32 g (i.e., 3.8 mmol) of NaHCO$_3$,
0.98 g (i.e., 2.6 mmol) of alkoxyamine (I) prepared in 1 A neutralized by an excess (1.7 equivalents) of sodium hydroxide.

These two solutions are subsequently mixed for 10 min using a magnetic stirrer. The mixture is subsequently subjected to high turbulence for 10 min via an ultrasonic probe (Branson 450, power 7), so as to obtain an emulsion having a drop size of the order of 10 nm.

The emulsion is subsequently introduced into a 500 ml jacketed reactor and degassed with nitrogen for 10 min. The reaction medium is then brought to 112° C. and this temperature is maintained by thermal regulation for 8 hours. Samples are withdrawn throughout the reaction in order:
to determine the kinetics of the polymerization by gravimetry (measurement of solids contents),
to monitor the change in the molecular weights as a function of the conversion.

The kinetic change in the polymerization and the change in the molar masses as a function of the conversion are presented in table 2 below. It is found that the conversion reaches 90% on polymerizing for 8 h.

TABLE 2

| Time (h) | Conversion (%) | Mn | Mw | PI |
|---|---|---|---|---|
| 1 | 21.7 | 10 300 | 16 200 | 1.6 |
| 1.5 | 38.3 | 17 000 | 22 500 | 1.3 |
| 2 | 51.9 | 20 400 | 26 200 | 1.3 |
| 2.5 | 61.1 | 22 600 | 28 800 | 1.3 |
| 4 | 76.4 | 28 900 | 35 400 | 1.2 |
| 8 | 89.7 | 36 100 | 49 300 | 1.4 |

Figure 1:
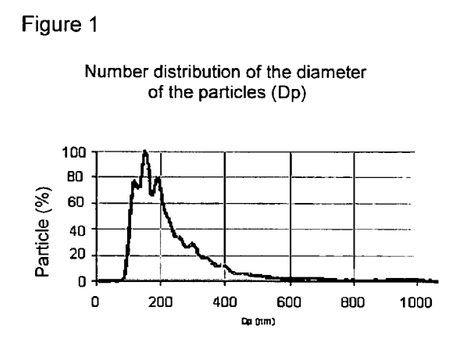
FIG. 1 is a plot of number of particles (%) vs. size showing the size distribution of example 3.

Latex Characteristics by CHDF (Capillary Hydrodynamic Fractionation)
cf FIG. 1

The 10% of residual monomers is then converted, in a 2nd stage, by conventional radical polymerization in the presence of potassium persulfate (Aldrich, 0.5 mol % with respect to the residual monomers). After degassing with nitrogen for 10 min with stirring, the reaction medium is then heated at 75° C. for 4 h and then cooled to ambient temperature. The conversion obtained, evaluated by gravimetry, is then greater than 98% by weight.

EXAMPLE 4

Controlled Radical Polymerization of Styrene Under Batch Conditions Initiated by the Water-soluble Alkoxyamine (I) Prepared in 1 A by the Miniemulsion Technique On the one hand, an organic solution is prepared by mixing:
85 g (i.e., 0.8 mol) of styrene,
0.85 g of polystyrene with an Mw of 330 000,
4.26 g (i.e., 19.0 mmol) of hexadecane.

On the other hand, an aqueous solution is prepared by mixing:
317 g of water,
1.87 g (i.e., 2.3 mmol) of emulsifying agent Dowfax 8390,
0.32 g (i.e., 3.8 mmol) of NaHCO$_3$,
0.96 g (i.e., 2.5 mmol) of alkoxyamine (I) prepared in 1 A neutralized by an excess (1.7 eq.) of sodium hydroxide.

These two solutions are subsequently mixed for 10 min using a magnetic stirrer. The mixture is subsequently subjected to high turbulence for 10 min via an ultrasonic probe (Branson 450, power 7), so as to obtain an emulsion having a drop size of the order of 10 nm.

The emulsion is subsequently introduced into a 500 ml jacketed reactor and degassed with nitrogen for 10 min. The reaction medium is then brought to 120° C. and this temperature is maintained by thermal regulation for 8 h. Samples are withdrawn throughout the reaction in order:
- to determine the kinetics of the polymerization by gravimetry (measurement of solids contents),
- to monitor the change in the molecular weights as a function of the conversion.

The change in the molar masses as a function of the conversion is presented in table 4 below. It is found that the conversion reaches 50% on polymerizing for 8 h.

TABLE 4

| Time (h) | Conversion (%) | Mn | Mw | PI |
|---|---|---|---|---|
| 2.5 | 12.9 | 13 800 | 17 100 | 1.24 |
| 4.25 | 21.7 | 19 700 | 24 100 | 1.22 |
| 5 | 28.5 | 23 400 | 28 600 | 1.22 |
| 6 | 35.5 | 26 700 | 33 500 | 1.25 |
| 8 | 50.3 | 34 200 | 44 100 | 1.29 |

Figure 2:
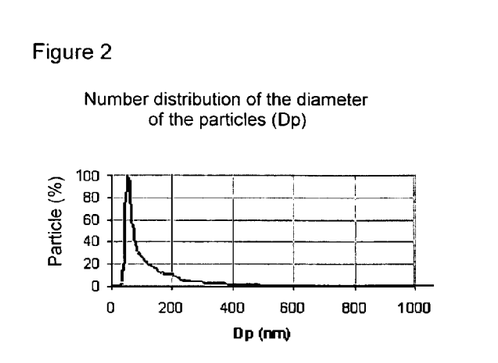
FIG. 2 is a plot of number of particles (%) vs. size showing the size distribution of example 4.

Characteristics of the Latex by CHDF (Capillary Hydrodynamic Fractionation):
cf FIG. 2

EXAMPLE 5

Controlled Radical Polymerization of Butyl Acrylate Under Batch Conditions Initiated by the Water-soluble Alkoxyamine (I) Prepared in 1 A by the Emulsion Technique 85 g (i.e., 0.66 mol) of butyl acrylate, 322 g of water, 1.87 g (i.e., 2.3 mmol) of emulsifying agent Dowfax 8390, 0.33 g (i.e., 3.9 mmol) of $NaHCO_3$, and 0.96 g (i.e., 2.5 mmol) of alkoxyamine (I) prepared in 1 A neutralized by an excess (1.7 eq.) of sodium hydroxide are introduced into a 500 ml jacketed reactor. The solution is degassed with nitrogen for 10 min. The reaction medium is then brought to 112° C. and this temperature is maintained by thermal regulation for 7 hours.

Samples are withdrawn throughout the reaction in order:
- to determine the kinetics of the polymerization by gravimetry (measurement of solids contents),
- to monitor the change in the molecular weights as a function of the conversion.

The change in the molar masses as a function of the conversion is presented in table 5 below. It is found that the conversion reaches 65% on polymerizing for 7 h.

TABLE 5

| Time (h) | Conversion (%) | Mn | Mw | PI |
|---|---|---|---|---|
| 2 | 16.2 | 10 100 | 13 100 | 1.30 |
| 2.5 | 25.5 | 12 400 | 15 700 | 1.27 |
| 3 | 31.8 | 14 700 | 17 900 | 1.22 |
| 4 | 50.0 | 17 700 | 21 600 | 1.22 |
| 5 | 59.1 | 21 800 | 26 200 | 1.20 |
| 7 | 64.8 | 28 200 | 34 000 | 1.21 |

The latex is stable at ambient temperature for several days and the polymer is recovered by coagulation at low temperature (−10° C.).

EXAMPLE 6

Controlled Radical Polymerization of Butyl Acrylate by the Emulsion Technique Initiated by the Water-soluble Alkoxyamine (I) Prepared in 1 A Starting from a Butyl Acrylate Seed Followed by Batch Addition of Butyl Acrylate (BuA)

The synthesis is carried out in 2 stages:

$1^{st}$ stage: preparation of a seed with a low level of solids (approximately 1% by weight)

3 g (i.e., 0.02 mol) of butyl acrylate, 409 g of water, 1.87 g (i.e., 2.3 mmol) of emulsifying agent Dowfax 8390, 0.43 g (i.e., 5.1 mmol) of $NaHCO_3$, and 0.95 g (i.e., 2.5 mmol) of alkoxyamine (I) prepared in 1 A neutralized by an excess (1.7 eq.) of sodium hydroxide are introduced into a 500 ml jacketed reactor. The solution is degassed with nitrogen for 10 min. The reaction medium is then brought to 112° C. and this temperature is maintained by thermal regulation for 8 h.

$2^{nd}$ stage: sequential addition of BuA to give an emulsion 30 g (i.e., 0.23 mol) of butyl acrylate are added to the preceding seed. After degassing with nitrogen, the reaction medium is brought to 112° C. and this temperature is maintained by thermal regulation for 8 h.

Samples are withdrawn throughout the reaction in order:
- to determine the kinetics of the polymerization by gravimetry (measurement of solids content),
- to monitor the change in the molecular weights as a function of the conversion.

The kinetic change in the polymerization and the change in the molar masses as a function of the conversion are presented in table 6 and FIG. 3 below. It is found that the conversion reaches 94% on polymerizing for 8 h.

TABLE 6

| Time (h) | Conversion (%) | Mn | Mw | PI |
|---|---|---|---|---|
| 1.5 | 20.8 | 10 210 | 14 280 | 1.40 |
| 3 | 45.9 | 19 010 | 24 820 | 1.31 |
| 4.5 | 78.3 | 30 290 | 43 250 | 1.43 |
| 6 | 91.5 | 37 670 | 64 430 | 1.71 |
| 8 | 94.8 | 40 370 | 68 430 | 1.70 |

Figure 3:
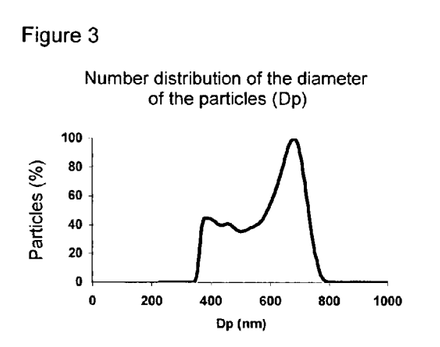
FIG. 3 is a plot of number of particles (%) vs. size showing the size distribution of example 6.

Latex Characteristics by CHDF (Capillary Hydrodynamic Fractionation)
cf FIG. 3

EXAMPLE 7

Controlled Radical Polymerization of Butyl Acrylate by the Emulsion Technique Initiated by the Water-soluble Alkoxyamine (I) Prepared in 1 A Starting from a Butyl Acrylate Seed Followed by Continuous Addition of Butyl Acrylate The preparation of the butyl acrylate seed with a low level of solids (approximately 1% by weight) is similar to that described in example 6. Nevertheless, the thermal regulation at 112° C. is maintained for only one hour before beginning the continuous addition of the 30 g (i.e., 0.23 mol) of butyl acrylate at 112° C. over a period of time of 3 h. This temperature is then maintained by thermal regulation for 8 hours.

Samples are withdrawn throughout the reaction in order:
to determine the kinetics of the polymerization by gravimetry (measurement of solids contents),
to monitor the change in the molecular weights as a function of the conversion.

The kinetic change in the polymerization and the change in the molar masses as a function of the conversion are presented in table 7 and in the curves of FIG. 4 below. It is found that the conversion reaches 95% on polymerizing for 8 h.

TABLE 7

| Time (h) | Conversion (%) | Mn | Mw | PI |
|---|---|---|---|---|
| 2.5 | 7.4 | 3101 | 5830 | 1.9 |
| 4.3 | 21.7 | 8552 | 12 400 | 1.5 |
| 5 | 68.4 | 23 210 | 30 110 | 1.3 |
| 6 | 83.1 | 32 560 | 43 310 | 1.3 |
| 8 | 94.8 | 38 530 | 57 370 | 1.5 |

Figure 4:
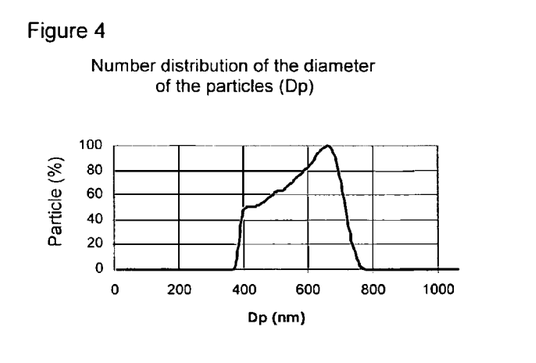
FIG. 4 is a plot of number of particles (%) vs. size showing the size distribution of example 7.

Characterization of the Latex by CHDF (Capillary Hydrodynamic Fractionation):
cf FIG. 4

EXAMPLE 8

Controlled Radical Polymerization of Styrene by the Emulsion Technique Initiated by the Water-soluble Alkoxyamine (I) Prepared in 1 A Starting from a Butyl Acrylate Seed Followed by Batch Addition of Styrene The synthesis is carried out in 2 stages:
$1^{st}$ stage: preparation of a butyl acrylate seed with a low level of solids (approximately 1% by weight)
0.7 g (i.e., 0.005 mol) of butyl acrylate, 90 g of water, 1.18 g (i.e., 1.4 mmol) of emulsifying agent Dowfax 8390, 0.09 g (i.e., 1.1 mmol) of NaHCO$_3$, and 0.21 g (i.e., 0.55 mmol) of alkoxyamine (I) prepared in 1 A neutralized by an excess (1.7 eq.) of sodium hydroxide are introduced into a 250 ml jacketed reactor. The solution is degassed with nitrogen for 10 min. The reaction medium is then brought to 112° C. and this temperature is maintained by thermal regulation for 8 h.

$2^{nd}$ stage: batch addition of styrene
18 g (i.e., 0.17 mol) of styrene are added to the preceding seed. After degassing with nitrogen, the reaction medium is brought to 120° C. and this temperature is maintained by thermal regulation for 8 h.

Samples are withdrawn throughout the reaction in order:
to determine the kinetics of the polymerization by gravimetry (measurement of solids contents),
to monitor the change in the molecular weights as a function of the conversion.

The kinetic change in the polymerization and the change in the molar masses as a function of the conversion are presented in table 8 and in the photograph of FIG. 5 below. It is found that the conversion reaches 87% on polymerizing for 8 h.

TABLE 8

| Time (h) | Conversion (%) | Mn | Mw | PI |
|---|---|---|---|---|
| 1.5 | 25.8 | 12 600 | 16 400 | 1.30 |
| 3 | 53.6 | 22 200 | 28 600 | 1.29 |
| 4.5 | 69.9 | 30 520 | 38 820 | 1.27 |
| 6.3 | 84.9 | 36 500 | 47 200 | 1.29 |
| 8 | 87.0 | 39 240 | 51 510 | 1.31 |

Figure 5:
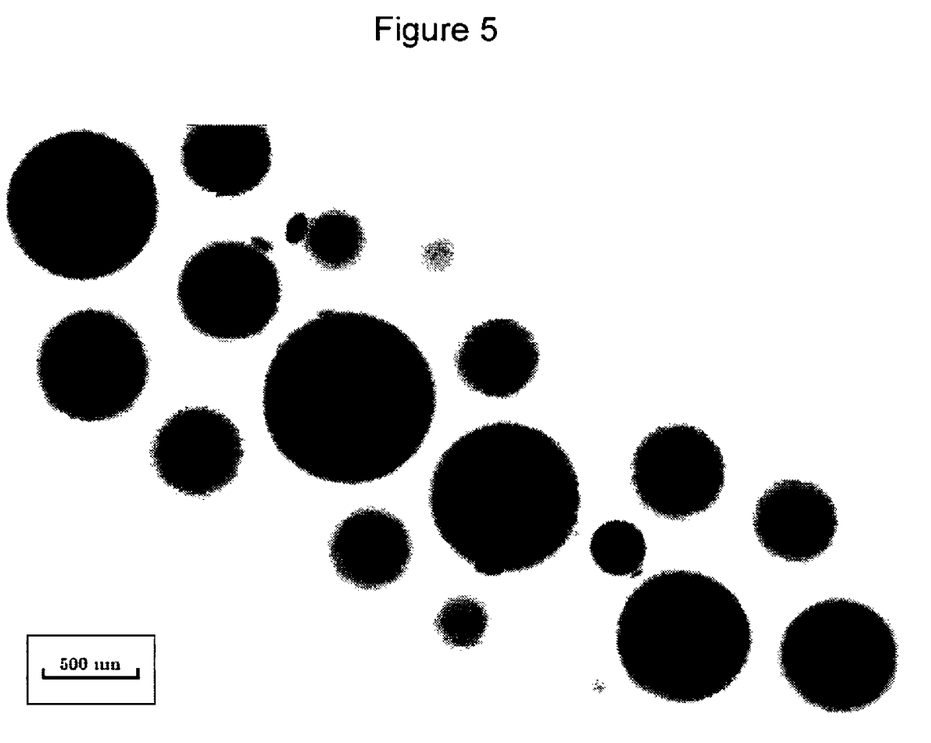
FIG. 5 is a characterization of the latex of example 8 via transmission electron microscopy.

Characterization of the Latex by Transmission Electron Microscopy
cf FIG. 5

What is claimed is:

1. A process for the miniemulsion, microemulsion or emulsion polymerization of at least one monomer which can be polymerized via radical polymerization, characterized in that it is carried out in the presence of at least one water-soluble alkoxyamine, dissolved in the aqueous phase of a miniemulsion, microemulsion or emulsion, selected from monoalkoxyamines of formula (I)

in which
* $R_1$ and $R_3$, which are identical or different, are selected from linear or branched alkyl radical having a number of carbon atoms ranging from 1 to 3,
* $R_2$ is selected from alkali metal, ammonium ion.

2. The process as claimed in claim 1 characterized in that said alkali metal is selected from Li, Na or K.

3. The process as claimed in claim 1 characterized in that said ammonium ion is selected from $NH_4^+$, $NBu_4^+$ or $NHBu_3^+$.

4. The process as claimed in claim 1, characterized in that the water-soluble alkoxyamine is present in the aqueous phase of a miniemulsion, microemulsion or emulsion in a proportion of 0.01% to 10% by weight with respect to the weight of said at least one monomer.

5. The process as claimed in claim 1, characterized in that the water-soluble alkoxyamine is present in the aqueous phase of a miniemulsion, microemulsion or emulsion in a proportion of 0.1 to 5% by weight with respect to the weight of said at least one monomer.

6. The process as claimed in claim 1, characterized in that said at least one monomer is selected from monomers exhibiting a carbon-carbon double bond capable of polymerizing via radical polymerization.

7. The process as claimed in claim 6, characterized in that. said at least one monomer is selected from the group consisting of vinylaromatic monomers, styrene, substituted styrene, α-methylstyrene, sodium styrenesulfonate, dienes, butadiene, isoprene, acrylic monomers, acrylic acid or its salts, alkyl acrylates, cycloalkyl acrylates, aryl acrylates, methyl acrylate, ethyl acrylate, butyl acrylate, ethylhexyl acrylate, phenyl acrylate, hydroxyalkyl acrylates, 2-hydroxyethyl acrylate, ether alkyl acrylates, 2-methoxyethyl acrylate, alkoxy- glycol acrylates, aryloxypolyalkylene glycol acrylates, methoxypolyethylene glycol acrylates, ethoxypolyethylene glycol acrylates, methoxypolypropylene glycol acrylates, methoxypolyethylene glycol-polypropylene glycol acrylates, aminoalkyl acrylates, 2-(dimethylamino)ethyl acrylate (ADAME), acrylates of amine salts, [2-(acryloyloxy)ethyl] trimethylammonium chloride, [2-(acryloyloxy)ethyl]-trimethylammonium sulfate, [2-(acryloyloxy)ethyl]dimethylbenzylammonium chloride, [2-(acryloyloxy)ethyl] dimethylbenzylammonium sulfate, fluoroacrylates, silylated acrylates, phosphorus-comprising acrylates, alkylene glycol acrylate phosphates, methacrylic monomers, methacrylic acid or its salts, alkyl methacrylate, cycloalkyl methacrylate, alkenyl methacrylate, aryl methacrylates, methyl methacrylate, lauryl methacrylate, cyclohexyl methacrylate, allyl methacrylate, phenyl methacrylate, hydroxyalkyl methacrylates, 2-hydroxyethyl methacrylate, 2-hydroxypropyl methacrylate, ether alkyl methacrylates, 2-ethoxyethyl methacrylate, alkoxy-glycol methacrylates, aryloxypolyalkylene glycol methacrylates, methoxypolyethylene glycol methacrylates, ethoxypolyethylene glycol methacrylates, methoxypolypropylene glycol methacrylates, methoxypolyethylene glycol-polypropylene glycol methacrylates, aminoalkyl methacrylates, 2-(dimethylamino)ethyl methacrylate (MADAME), methacrylates of amine salts, [2-(methacryloyloxy) ethyl]trimethylammonium chloride, [2-(methacryloyloxy) ethyl]trimethylammonium sulfate, [2-(methacryloyloxy)-ethyl]dimethylbenzylammonium chloride, [2-(methacryloyloxy)-ethyl ]dimethylbenzylammonium sulfate, fluoromethacrylates, 2,2,2-trifluoroethyl methacrylate, silylated methacrylates, 3-methacryloyloxypropyltrimethylsilane, phosphorus-comprising methacrylates, alkylene glycol methacrylate phosphates, hydroxyethylimidazolidone methacrylate, hydroxyethylimidazolidinone methacrylate, 2-(2-oxo-1-imidazolidinyl)ethyl methacrylate, acrylonitrile, acrylamide, substituted acrylamides, 4-acryloylmorpholine, N-methylolacrylamide, acrylamidopropyltrimethylammonium chloride (APTAC), acrylamidomethyipropanesulfonic acid (AMPS) or its salts, methacrylamide, substituted methacrylamides, N-methylolmethacrylamide, methacrylamidopropyltrimethylammonium chloride (MAPTAC), itaconic acid, maleic acid or its salts, maleic anhydride, alkyl glycol maleates, alkoxy-glycol maleates, aryloxypolyalkylene glycol maleates, alkyl glycol hemimaleates, alkoxyglycol hemimaleates, aryloxypolyalkylene glycol hemimaleates, vinylpyridine, vinylpyrrolidinone, (alkoxy)poly (alkylene glycol) vinyl ethers, (alkoxy)poly(alkylene glycol) divinyl ethers, methoxypoly(ethylene glycol) vinyl ether, poly(ethylene glycol) divinyl ether, olefinic monomers, ethylene, butene, hexene and 1-octene, fluoroolefinic monomers, vinylidene monomers, vinylidene fluoride and a mixture of at least two abovementioned monomers.

8. The process as claimed in claim 1, characterized in that said process comprises stirring, with high shearing, to form the miniemulsion, microemulsion or emulsion, an aqueous phase comprising:
water,
said at least one water-soluble alkoxyamine,
optionally an anionic, cationic, nonionic, amphoteric, quaternary or fluorinated, emulsifying agent, and
an organic phase comprising:
said at least one monomer,
an optional organic solvent,
an optional cosolvent, which exhibits a solubility in water at 25° C. of less than $1 \times 10^{-6}$ g/liter and is liquid at the process temperature, and at a pressure sufficient to prevent the phases of the emulsion from boiling and sufficient for its various constituents to remain essentially in the emulsion, and
optionally at least one free radical initiator selected from organic peroxides, inorganic peroxides, or azo type.

9. The process of claim 8, characterized in that said temperature is between about 10 and 130° C.

10. A process for the preparation of multiblock polymers, characterized in that, in a first stage, a first block is prepared from one or more monomers according to the process described in claim 1, then a second monomer or a mixture of second monomers intended for the preparation of a second block is introduced without halting mixing and without cooling or other interruption, optionally followed by the introduction of a third monomer or a mixture of third monomers, at conditions for forming each of the blocks, optionally followed by a stage of conversion of the residual monomers using an additional supply of free radical initiator(s) of organic peroxide, inorganic peroxide or of azo type.

11. A polymer particle, characterized in that it comprises a polymer produced according to the process of claim 1.

12. The polymer particle as claimed in claim 11, characterized in that the polymer is a block polymer.

13. The particle as claimed in claim 12, characterized in that the polymer is selected from the group consisting of
polystyrene-b-poly(methyl methacrylate),
polystyrene-b-polystyrenesulfonate,
polystyrene-b-polyacrylamide,
polystyrene-b-polymethacrylamide,
poly(methyl methacrylate)-b-poly(ethyl acrylate),
polystyrene-b-poly(butyl acrylate),
polybutadiene-b-poly(methyl methacrylate),
polyisoprene-b-poly(styrene-co-acrylonitrile),
polybutadiene-b-poly(styrene-co-acrylonitrile),
poly(styrene-co-butyl acrylate)-b-poly(methyl methacrylate),
polystyrene-b-poly(vinyl acetate),
polystyrene-b-poly(2-ethylhexyl acrylate),
polystyrene-b-poly(methyl methacrylate-co-hydroxyethyl acrylate),
polystyrene-b-polybutadiene-b-poly(methyl methacrylate),
polybutadiene-b-polystyrene-b-poly(methyl methacrylate),
polystyrene-b-poly(butyl acrylate)-b-polystyrene,
polystyrene-b-polybutadiene-b-polystyrene,
polystyrene-b-polyisoprene-b-polystyrene,
poly(perfluorooctyl acrylate)-b-poly(methyl methacrylate),
poly(perfluorooctyl acrylate)-b-polystyrene,
poly(perfluorooctyl acrylate)-b-poly(behenyl acrylate),
poly(perfluorooctyl acrylate)-b-poly(stearyl methacrylate),
poly(n-octyl acrylate)-b-poly(methyl methacrylate),
poly(methyl methacrylate)-b-poly(butyl acrylate)-b-poly (methyl methacrylate),
poly(methyl methacrylate)-b-poly(methoxyethyl acrylate)-b-poly(methyl acrylate), and
poly((meth)acrylic acid)-b-poly(butyl acrylate)-b-poly ((meth)acrylic acid).

14. A combination of polymer particles as claimed in claim 11, characterized in that the mean diameter of said polymer particles is less than or equal to 2 μm.

15. A combination of polymer particles as claimed in claim 14, characterized in that the mean diameter of said polymer particles is preferably between 20 and 1000 nm.

16. A latex comprising a combination of polymer particles as defined in claim 15.

* * * * *